United States Patent [19]

Chaivre et al.

[11] 4,056,862
[45] Nov. 8, 1977

[54] METHOD AND APPARATUS FOR FORMING A WHEEL NUT WITH WELDED CAP

[75] Inventors: Joseph W. Chaivre; Albert A. Jadach, both of Royal Oak, Mich.

[73] Assignee: Towne Robinson Fastener Company, Southfield, Mich.

[21] Appl. No.: 710,256

[22] Filed: July 30, 1976

Related U.S. Application Data

[63] Continuation-in-part of Ser. No. 672,746, April 1, 1976.

[51] Int. Cl.² .............................................. B21D 53/24
[52] U.S. Cl. ..................................... 10/72 R; 10/86 C
[58] Field of Search ............. 10/72 R, 85, 86 R, 86 C, 10/86 CL; 85/9 W, 32 WE, 35

[56] References Cited

U.S. PATENT DOCUMENTS

| 407,564 | 7/1889 | Baker | 85/35 |
|---|---|---|---|
| 787,578 | 4/1905 | Lambert | 10/86 C |
| 1,727,590 | 9/1929 | Ferry | 10/86 C |
| 1,829,972 | 11/1931 | Wiley | 10/86 C |
| 2,050,867 | 8/1936 | Teare | 85/32 WE |
| 3,364,806 | 1/1968 | Chaivre | 85/35 |
| 3,955,231 | 5/1976 | Erdmann | 10/86 C |

FOREIGN PATENT DOCUMENTS

| 512,983 | 2/1955 | Italy | 10/86 C |

*Primary Examiner*—E. M. Combs
*Attorney, Agent, or Firm*—Krass & Young

[57] ABSTRACT

A stainless steel sheath for a wheel nut is welded to the nut body in limited areas by bringing electrodes into pressured contact with the conical nut end, which is unsheathed, and a section of the overlying the body. A capacitor then passes a short, low voltage, high current electric pulse through the electrodes to resistance weld the sheath to the body, beneath the sheath electrode without altering the metallurgy of the cap or the body.

10 Claims, 10 Drawing Figures

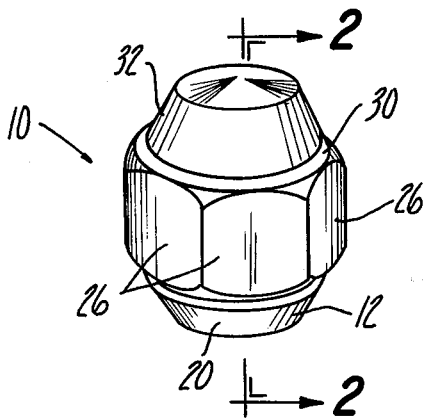
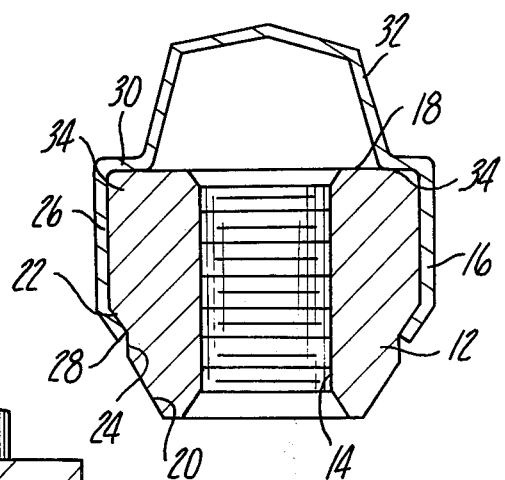
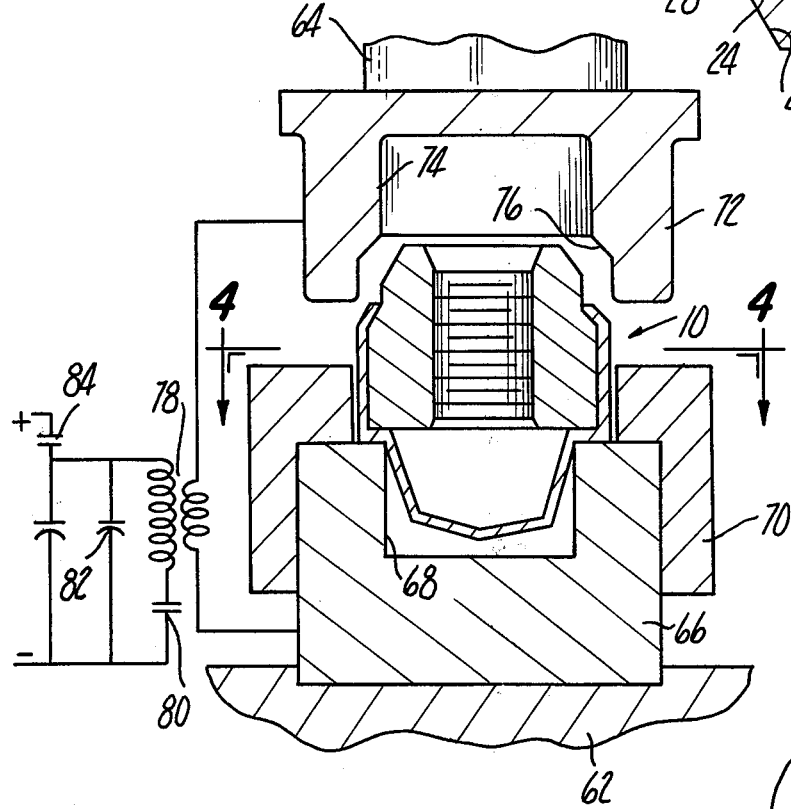
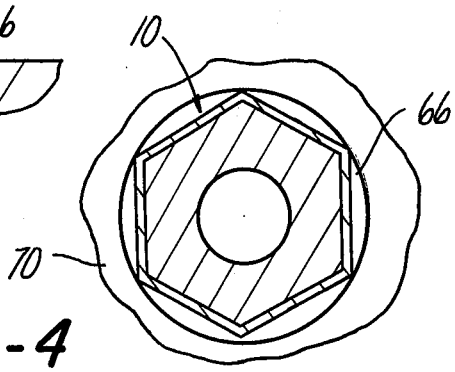

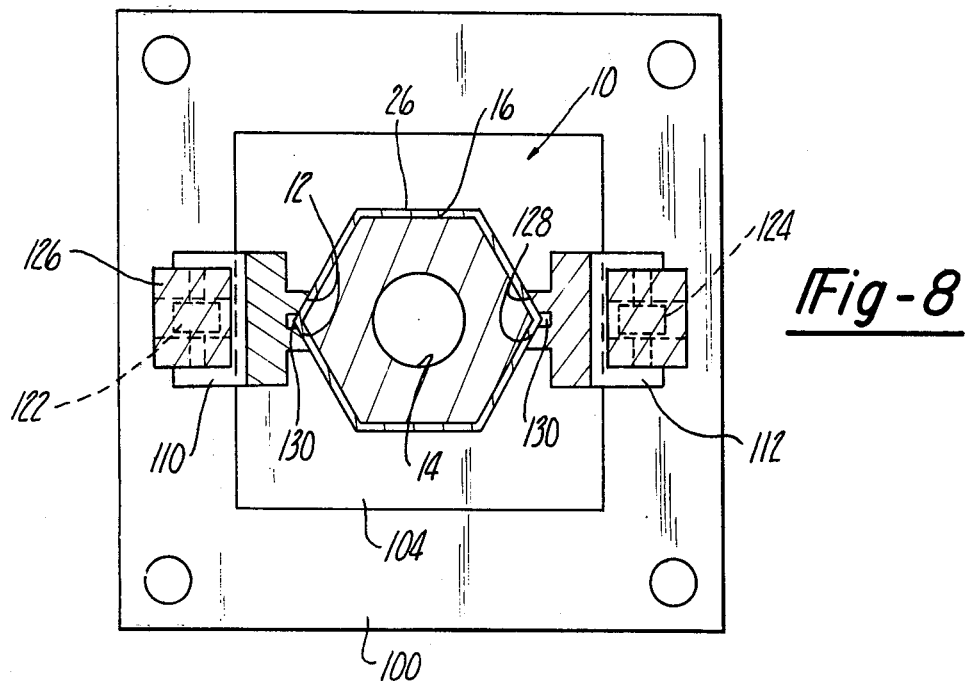
Fig-8
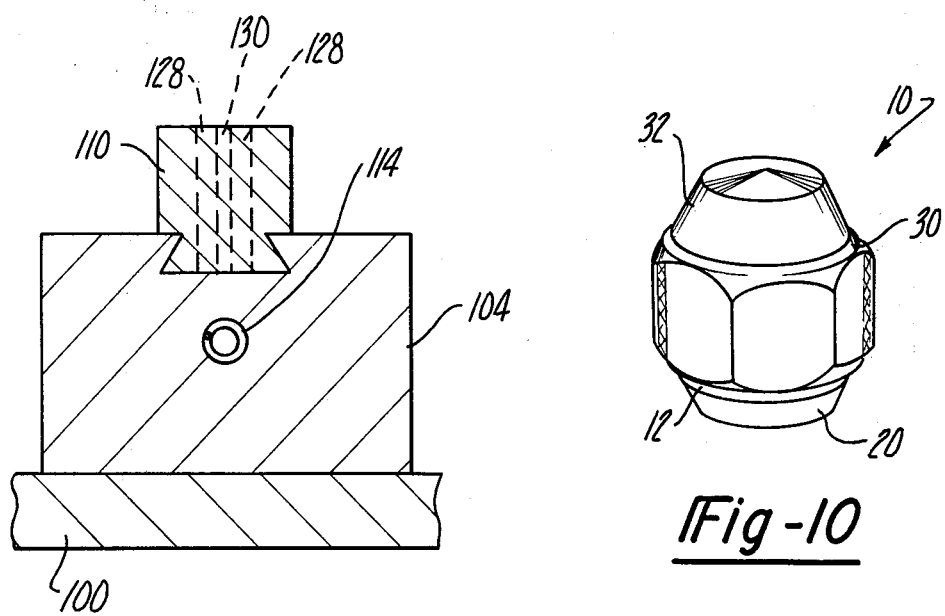
Fig-9
Fig-10

METHOD AND APPARATUS FOR FORMING A WHEEL NUT WITH WELDED CAP

REFERENCE TO RELATED APPLICATIONS

This application is a continuation-in-part of application Ser. No. 672,746, filed Apr. 1, 1976, and assigned to the assignee of the subject application.

BACKGROUND OF THE INVENTION

1. Field of the Invention

This invention relates to a capped wheel nut having a nut body with a conical end and a stainless steel sheath covering the wrench flats and the end opposite to the conical end, and terminating adjacent the joinder between the wrench flats and the conical end, and to a method and apparatus for resistance welding the sheath to the nut body.

2. Prior Art

Most modern automotive wheels are removably attached to the axle by a ring of threaded studs which extend outwardly from conical depressions formed in the axle end. The wheel contains a similar ring of holes formed with conically dished edges which abut the depressions in the axle end so that the studs extend through the wheel holes. Wheel nuts are then threaded on the studs to secure the wheel to the axle. The nuts and extending studs may be surrounded by a dish-shaped cover which attaches to the wheel to hide and protect the nuts and studs. Alternatively, wheel nuts having integral caps that enclose the volume about the end of the nut opposite to that which contacts the wheel may be employed instead of the wheel covers. The cap protects the projecting end of the stud from damage due to weathering and impacts.

These capped nuts have typically been formed out of bar stock, on turning machines, with the caps being formed integrally with the nut body. Alternatively, capped nuts have been proposed wherein a conventional nut body is fully covered by a stainless steel sheath which exposes one threaded opening of the nut and forms a domed cover over the other opening. U.S. Pat. No. 3,364,806, assigned to the assignee of the present invention, discloses a variation on the sheathed wheel nut wherein the conical end section of the nut body, which is adapted to bear against a conical depression in a wheel, is left unsheathed, with the sheath terminating at a land formed between one end of the wrench flats and the adjacent section of the conical end.

On this nut the free edges of the sheath are crimped against a shoulder formed at this land to retain the sheath to the cap but wrenching forces and accidental road impacts from stones and the like may loosen the sheath so that it tends to rattle when the vehicle is driven. Adhesives have been applied between the contacting surfaces of the sheath and body to prevent this loosening, but it is difficult and expensive to apply an amount of adhesive which will securely retain the sheath to the cap without getting any adhesive on the threads.

It has also been proposed to weld the cap to the nut. This insures rigid attachment and eliminates the danger of clogging the nut threads with the adhesive, but presents certain problems in application. For one thing, the heat generated in the welding process may adversely affect the heat treatment of the nut, as by unacceptably softening it, and may affect the metallurgy of the cap to discolor it or reduce its oxidation resistance.

Welding systems which pass a low voltage, high current pulse of very short duration through the interface between the pair of metallic members have previously been employed in certain applications wherein at least one of the metallic elements would be damaged by the passage of the more conventional lower current, longer duration resistance welding pulses. These systems typically employ relatively large capacitors to accumulate the welding power from a direct current power supply. After the capacitors are fully charged a switch is closed which passes the capacitor current through the two parts to be welded.

The present invention is broadly directed toward a method of welding the stainless steel sheath of a capped wheel nut to the nut body, using capacitive discharge welding, to form positive engagement between the two which will resist the forces that are applied during wrenching of the nut and by virtue of accidental impacts during use, to prevent loosening of the nut and the resultant rattling noises produced when a vehicle with a loosened cap is driven.

SUMMARY OF THE INVENTION

The present invention makes use of the fact that after the free end of the sheath has been crimped against the section of the nut body that connects the end of the wrench flats to the conical wheel engaging surface, the conical surface is exposed. Broadly, the method of the present invention involves bringing a welding electrode into pressured engagement with that conical surface and bringing a second electrode into pressured engagement with a section of the sheath that lies over a surface of the nut body to force that sheath area into intimate engagement with the nut body. An extremely short, very low voltage, high current electrical pulse is then passed through the electrodes. Preferably this pulse is derived from a bank of capacitors.

The high pressure contact between the two electrodes and the nut body and sheath respectively are of relatively low resistance so that the highest resistance portion of the electric circuit through which the capacitor discharges is formed by the interface between the sheath and the nut body surface immediately beneath the sheath area contacted by the electrodes. The balance of the contacting surface between the sheath and the nut body affords such an extremely high resistance that virtually no electric current passes through it. The current is thus concentrated into the small area immediately below the contacting electrode and a large conversion of electric power to heat occurs at that point. The method of the present invention thus bears resemblance to spot welding, although the welded area may take the form of a line.

The method of the present invention thus makes use of the novel construction of a sheathed wheel nut having an exposed conical end and would not be directly applicable to other forms of capped wheel nuts where the sheath fully covers the nut.

Other objectives, advantages and applications of the present invention will be made apparent by the following detailed description of two embodiments of the invention. The description makes reference to the accompanying drawings in which:

FIG. 1 is a perspective view of a capped wheel nut formed in accordance with the present invention;

FIG. 2 is a sectional view through the nut of FIG. 1 taken along line 2—2 in FIG. 1;

FIG. 3 is a sectional view through a welding fixture loaded with the components of capped wheel nut of the type illustrated in FIGS. 1 and 2, illustrating the process of welding the cap to the nut body with a capacitor discharge welding circuit illustrated schematically;

FIG. 4 is a sectional view through the nut in fixture of FIG. 3, as taken along line 4—4 of FIG. 3;

FIG. 8 is a sectional view through the apparatus of FIGS. 5 and 6, taken along line 8—8 of FIG. 7;

FIG. 9 is a detailed sectional elevational view taken along lines 9—9 of FIG. 6; and FIG. 10 is a perspective view of a cap nut formed in the apparatus of FIGS. 6-9.

Figure 5:
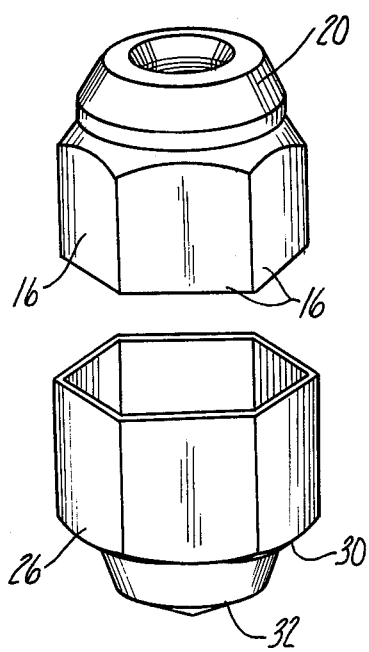
FIG. 5 is an exploded perspective view of the cap nut of FIG. 1.
Figure 6:
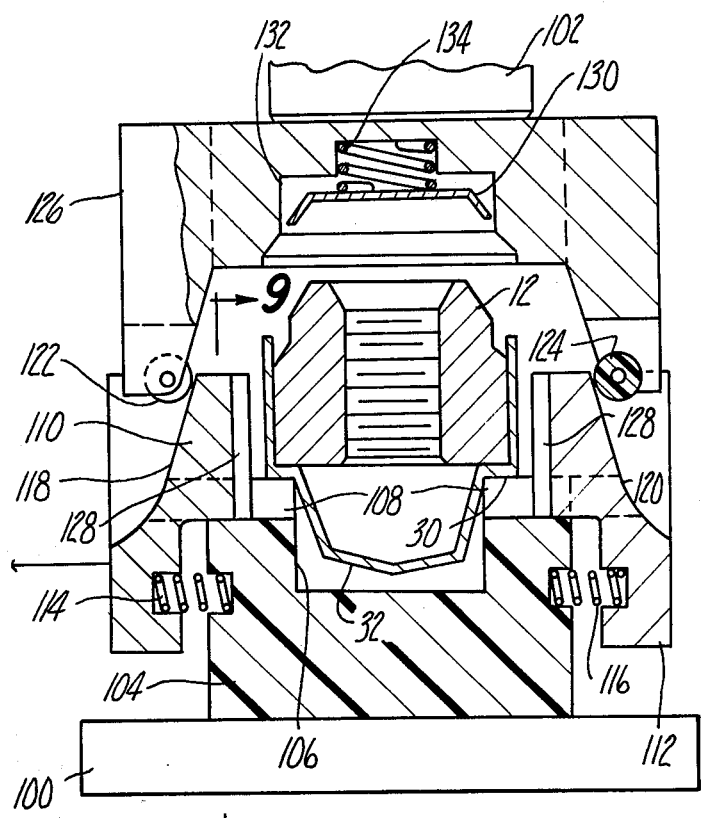
FIG. 6 is an elevational sectional view, partly broken away, of a second embodiment of apparatus for welding the nut body to the sheath.

The capped wheel nut illustrated in FIGS. 1 and 2, generally indicated at 10, has a configuration generally resembling the nut of U.S. Pat. No. 3,364,806. The nut body or insert 12, has a central threaded aperture 14 and hexagonal wrench flats 16 arranged parallel to the axis of the aperture. One end of the nut 18 is generally flat and the other end of the nut is formed with a conical surface 20 that is adapted to mate with the conical depressions typically formed around the stud holds in a conventional automotive wheel. The ends of the wrench flats 16 adjacent to the conical end 20 are formed with a laterally inwardly directed chamfer or shoulder 22 to meet a short cylindrical land 24 which connects with the conical end 20. The land 24 may have a diameter approximating the width of the nut body between a pair of opposed wrench flats 16 so that the chamfer or shoulder 22 extends only adjacent the corners of the flats.

The nut body 12 is covered by a sheath or cap formed of sheet metal, preferably stainless steel. The cap has sections 26 which extend over the wrench flats 16 and the free edge of the cap is turned over the chamber 22, so as to terminate adjacent the cylindrical land 24. This arrangement, claimed in U.S. Pat. No. 3,364,806, provides a neat termination for the free edge 28 of the sheath, formed so the edge will not interfere with the secure joinder of the nut to the conical wheel depression, and the forces exerted between the nut and the wheel will not tend to loosen the cap from the nut body.

The other end of the cap is formed with a flat, laterally extending "ring" 30 which projects normally to the section 26 of the cap and accordingly has its inner surface in close abutment to the outer peripheral edge of the nut end 18. This ring extends around the full perimeter of the cap. The cap has a cylindrical domed end 32 extending upwardly from the nut end 18. The cap provides clearance for ends of studs which may project beyond the nut ends 18 and also serves an aesthetic purpose.

The flat, normally extending ring 30 overlies a section of the flat end 18 of the nut from the base of the domed section 32 to the corner connecting to the flat covering sections 26. The width of the ring varies along its perimeter, from a minimum at the center of one of the flat sections, but the minimum width is preferably at least about .025 inches.

The capped wheel nut as heretofore described is substantially the same as the nut described in U.S. Pat. No. 3,364,806, with the exception of the provision of the laterally extending ring 30. In the present capped nut 10, the contacting surfaces of the ring 30 and the nut end 18 are resistance welded together, as at 34. This weld securely retains the cap to the nut body 12 so that their engagement does not depend upon the bend of free end 28 of the cap around the chamfered section 22 of the nut body. This welded joinder securely retains the nut against the forces that tend to dislodge the cap from the body during wrenching of the nut, and impact forces experienced while the nut is in service. As will be subsequently described, the weld is formed in such a manner as to leave the finish of the sheet metal cap unimpaired.

Welding of the caps to nut bodies, in accordance with the method of the present invention, is preferably performed in apparatus of the type illustrated in FIGS. 3 and 4. The apparatus is shown assembling a nut of the type illustrated in FIGS. 1 and 2, generally indicated at 10.

The apparatus employs a press mechanism having a fixed lower platen 62 and an upper movable platen 64. The balance of the press apparatus is conventional, and is not illustrated.

A lower steel die 66 is supported in the lower platen 62. The die 66 has an upwardly extending annular support section 68. The internal diameter of the section 68 is equal to the internal diameter of the weld ring to be formed between the nut body and cap of the assembly 10. An annular sleeve 70 formed of phenolic or a similar thermo-set plastic is supported over the annular section 68 of the die. The interior diameter of the plastic retainer 70 is slightly larger than the cross dimension of the cap across the corners of the wrench flats.

Accordingly, when the loosely assembled nut and cap 10 are inserted into the plastic retainer 70, the domed section of the cap extends within the interior diameter of the annular section 68, with the outer surface of the cap, at the ring section, resting on the top of the annular section 68. The cap is held within the retainer 70, so that the uncapped, chamfered end of the nut projects upwardly above the retainer 70.

A steel upper die member 72 is fixed to and projects downwardly from the upper platen 64. The die 72 has a central opening 74 and a chamfered edge 72 which extends at an angle complementary to the cone angle of the chamfer at the end of the nut 10. When the press platens 62 and 64 are brought together this chamfer engages the conical end of the nut and presses the nut downwardly against the upper end of annular die section 68, pressing the nut insert against the inner surface of the cap at the ring area. The press force is preferably in the range of 3,000 to 4,000 pounds resulting in a force between the contracting surfaces of the cap and insert of in excess of 1000 p.s.i.

A welding current is then applied to the nut and insert via a welding circuit which includes a transformer 78 having its secondary coil connected to the dies 66 and 72. The primary of the transformer 78 is connected in series with a contactor 80 across a bank of relatively large electrolytic capacitors 82. The capacitors may be connected to a charging source by a second contact 84. In operation, the contacts 80 are opened and the contacts 84 are closed to charge the capacitors 82. Then the contacts 84 are opened and the contacts 80 are closed, discharging the energy stored in the capacitors 82 through the primary of the transformer 78. This induces a current in the secondary which is passed between the nut insert and the cap at the ring area.

The weld voltage typically varies between 2 and 5 volts and the weld current must be more than about 50,000 amperes and preferably will be in the range of 60,000 to 80,000 amperes. The weld time must be less than about 30 microseconds and will typically be from 6 to 9 microseconds. As a result, heating occurs principally at the interface between the cap and the nut, at the ring area. The weld time is so short that the cap does not oxidize and the heating action does not cause the carbon in the stainless steel to migrate to the grain boundaries to lower its corrosion resistance. The heat applied to the nut is not sufficient to affect its hardness.

The welding circuit illustrated is a simplified version of a conventional capacitor discharge circuit, and it should be understood that any type of welder circuit which can apply an extremely short duration, high current pulse to the interface between the cap and the nut, while the nut is being forced into the cap at the ring area, could be used with the present invention.

An alternative form of press tooling for welding a cap to a nut body is disclosed in FIGS. 5-8. The press employs a fixed lower platen 100 and a movable upper platen 102. A lower die support 104 is affixed to the upper side of the lower platen 100. The support 104 has a cavity 106 formed on its upper surface which is adapted to receive the domed section 32 of the stainless steel nut sheath. An insulated retainer 108 is affixed to the upper surface of the support 104 and rests beneath the ring 30 on the outer surface of the sheath, so that the domed section 32 projects into the recess 106.

A pair of electrodes 110 and 112 are supported for horizontal sliding movement along the upper edges of the support 104, at diametrically opposed points surrounding the cavity 106. The electrodes 110 and 112 are biased toward their maximum separation from one another by a pair of coil springs 114 and 116. Their motion in this direction is limited by the contact between cam surfaces 118 and 120, formed on the radially outer sides of the electrodes 110 and 112 respectively, and contacting cam rollers 122 and 124 respectively which are affixed to downwardly projecting sections of a drive member 126 which is supported on the movable platen 102.

Figure 7:
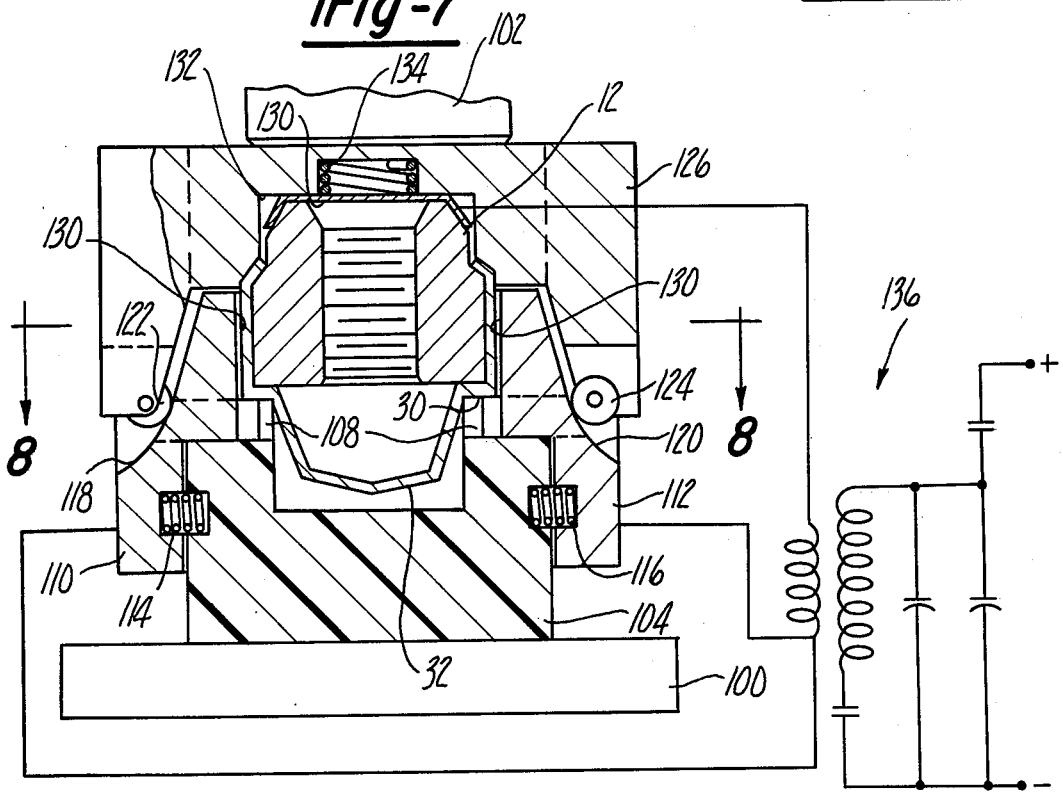
FIG. 7 is an elevational sectional view of the apparatus of FIG. 5, partially broken away for purposes of illustration, and in a welding position.

The radially inner surfaces of the electrodes 110 and 112 are each formed with a pair of vertically aligned horizontally extending sections 128. Grooves 130 are formed between each pair of extending sections. The outer surfaces of the electrode sections 128 are inclined relative to one another in the vertical plane as is best seen in FIG. 7 of the drawing.

When the upper platen 102 is driven downwardly, the rollers 122 and 124 engage the cam surfaces 118 and 120 and force the electrodes 110 and 112 radially inward. Each of the electrode surfaces 128 then contact the surfaces of the sheath 16 along the pair of lines on either side of one corner of the sheath. When the electrodes contact the sheath these lines extend along substantially the full length of the wrench flats.

At the same time that the electrodes 110 and 112 are moved into contact with the sheath the downward motion of the upper platen brings a cap 130 into contact with the exposed conical nut surface 12. The cap 130 is retained in a cavity 132 of the drive 126 by a heavy coil spring 134. Thus when the cap 130 comes into contact with the conical nut end 12 the continued downward motion of the drive section 126 compresses the spring 134.

The cap 30 acts as one of the welding electrodes, in combination with the other two electrodes 110 and 112. The electrodes 110 and 112 are connected to one terminal of a capacitive discharge power supply 136 while the cap is connected to the other terminal. The power supply may be of the same type illustrated in FIG. 3.

The electrodes 110 and 112 and the cap 130 exert forces on the sheath and nuts respectively, in excess of 1000 psi. When the weld current is passed between the electrodes, it flows between the nut body and the cap at the areas underlying the cap surfaces contacted by the electrodes 110 and 112, welding these areas. The short duration of the electric pulse prevents a substantial propogation of heat from the weld site and accordingly the gross metallurgies of the nut and the sheath are not affected.

The embodiments of the invention in which an exclusive property or privilege is claimed are defined as follows:

1. The method of forming a wheel nut having polygonal wrench flats, a conical wheel engaging end, and a stainless steel sheath which covers the wrench flats and the end of the nut opposite to the conical end and terminates adjacent the joinder between the wrench flats and the conical end, comprising: bringing a first electrode into pressured contact with the conical nut end; bringing a second electrode into pressured contact with a section of the sheath directly overlying the nut to exert forces between the sheath and the nut in the area adjacent to that contacted by the second electrode; and passing an electric pulse having a duration of less than 30 microseconds and a peak current in excess of 50,000 amperes, between said first and second electrodes, to form a weld between the contacting surfaces of the sheath and the nut at said areas adjacent to the section contacted by the second electrode without deleterious metallurgical changes occurring in the surface of the sheath contacted by said second electrode.

2. The method of claim 1 wherein said second electrode imposes a force of at least 1000 pounds per square inch between the sheath and the nut in the area adjacent to the sheath area contacted by said second electrode.

3. The method of claim 2 wherein the step of bringing a second electrode into pressured contact with the conical nut end comprises contacting said sheath at a pair of substantially diametrically opposed areas to impose balanced forces on the assembly of the sheath and nut body.

4. The method of claim 3 wherein the step of bringing a second electrode into pressured contact with the conical nut end comprises engaging the sheath on opposed sides of a corner formed by a pair of intersecting wrench flats.

5. The method of claim 4 in which the contact between the second electrode and the sheath is along lines extending parallel to the elongated axis of the nut.

6. The method of claim 1 in which said second electrode contacts the sheath, the sheath section having an extension normal to the central axis of the nut and the first electrode contacts the conical section of the nut with a force having a component parallel to the longitudinal axis of the nut, so that said first and second electrodes impose balanced forces on the nut body.

7. The method of claim 1 in which the step of passing an electric current between the first and second electrodes includes the step of charging a capacitance and connecting the opposed ends of the capacitance to the first and second electrodes when the electrodes are in pressured contact with the nut.

8. The method of forming a capped wheel nut having a nut body formed with polygonal wrench flats, a conical wheel engaging end, and a planar end opposite to said conical end, and a sheath formed of 10-25, or a similar composition of stainless steel, the sheath covering the wrench flats and said planar end of the nut body, and terminating adjacent to the joinder between the wrench flats and the conical end, said sheath being provided with shoulder means which contacts a portion of said planar end, said method comprising: bringing a first electrode into pressured contact with the conical end of the nut; bringing a second electrode into pressured contact with the sheath to impose a force between the contacting surfaces of the sheath at said shoulder means only and said planar end portion; charging a capacitance; connecting said capacitance to the first and second electrodes, and discharging said capacitance to pass an electrical current pulse through the sheath and nut body, and welding the sheath to the nut body at said contacting surfaces of said shoulder means and said planar end portion without welding the remaining contacting surfaces of the sheath and nut body and without causing substantial discoloration of the surface of the sheath contacted by the second electrode, or carbon migration in the sheath which may result in later oxidization.

9. The method of claim 8 in which a force of at least 1000 pounds per square inch is exerted by said second electrode onto said sheath.

10. Apparatus for welding a nut body having polygonal wrench flats, a conical wheel engaging end, and a planar end opposite to said conical end, and a decorative and protective stainless steel sheath which covers the wrench flats and said planar end of the nut body, and terminates adjacent the joinder between the wrench flats and the conical end, said sheath being provided with shoulder means which contacts a portion of said planar end, said apparatus comprising: a press having a fixed platen and a movable platen; a first electrode supported on one of the platens and having a shape conforming to the conical nut end; a second electrode connected to the other press platen and having a shape to contact only said shoulder means of said sheath; a capacitor; a power supply for charging the capacitor; and circuitry including a switch connecting the capacitor to the electrodes, said platen being moveable to bring said first and second electrodes into pressured contact with the nut and the switch may be closed to pass current between the sheath and nut body, forming welds at the contacting surfaces of said shoulder means and said planar end portion without welding the remaining contacting surfaces of the sheath and the nut body, whereby the sheath may be welded to the nut body without deleteriously affecting the metallurgy of the sheath's surface.

* * * * *

UNITED STATES PATENT AND TRADEMARK OFFICE
Certificate

Patent No. 4,056,862            Patented November 8, 1977

Joseph W. Chaivre and Albert A. Jadach

Application having been made by Joseph W. Chaivre and Albert A. Jadach, the inventors named in the patent above identified, and Towne Robinson Fastener Company, the assignee, for the issuance of a certificate under the provisions of Title 35, Section 256, of the United States Code, deleting the name of Joseph W. Chaivre as a joint inventor, and a showing and proof of facts satisfying the requirements of the said section having been submitted, it is this 1st day of July 1980, certified that the name of the said Joseph W. Chaivre is hereby deleted from the said patent as a joint inventor with the said Albert A. Jadach.

FRED W. SHERLING,
*Associate Solicitor.*